No. 670,544. Patented Mar. 26, 1901.
J. PFEIFFER.
VEHICLE TIRE.
(Application filed Sept. 12, 1900.)

(No Model.)

ATTEST.
W. Bullosor
M. A. Sheehan.

INVENTOR.
Jacob Pfeiffer
BY H. T. Fisher ATTY

UNITED STATES PATENT OFFICE.

JACOB PFEIFFER, OF AKRON, OHIO.

VEHICLE-TIRE.

SPECIFICATION forming part of Letters Patent No. 670,544, dated March 26, 1901.

Application filed September 12, 1900. Serial No. 29,751. (No model.)

*To all whom it may concern:*

Be it known that I, JACOB PFEIFFER, a citizen of the United States, residing at Akron, in the county of Summit and State of Ohio, have invented certain new and useful Improvements in Vehicle-Tires; and I do declare that the following is a full, clear, and exact description of the invention, which will enable others skilled in the art to which it appertains to make and use the same.

My invention relates to improvements in solid-rubber tires for vehicle-wheels; and the invention consists in the construction and combination of parts, substantially as shown and described, and particularly pointed out in the claims.

Figure 1:
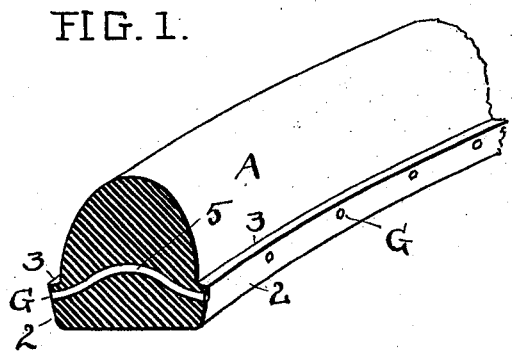
Figure 2:
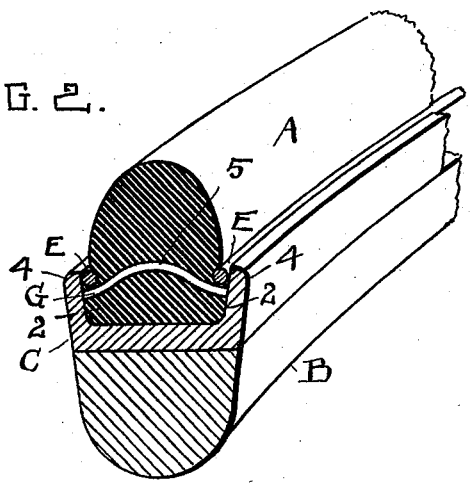

In the accompanying drawings, Figure 1 is a perspective elevation of a section of my improved tire, and Fig. 2 is a perspective elevation of a section of a wheel and of my tire in working position thereon.

I am of course aware that solid-rubber tires having side ledges for securing them are not broadly new and that it is not broadly new to run cross-wires at intervals through the base of the tire for engagement by binding-wires in a channeled metallic rim, somewhat as shown here, and yet I am not aware that a tire having the peculiarities of construction and advantages in operation possessed by this tire has ever before been known or used.

As shown in the drawings, A represents the tire complete; B, the usual wooden rim corresponding to the fellies of a wheel, and C a channel-iron rim on the periphery of part B, and for the purpose of distinguishing said parts by name the part C will be referred to as the "rim proper."

The tire A is solid and has a solid base that is widened at both sides by equal lateral extensions 2 of a suitable depth and referred to herein as "ledges," the said extensions having shoulders or offsets 3 along their top adapted to be engaged by the tie-wires E. The ledges or extensions correspond in depth substantially to the depth of side flanges 4 of rim C, and the base of the tire is designed to fit snugly in and between said flanges, so as to make a perfectly-tight connection at the bottom and sides; but at the most the ledges 2 are necessarily very shallow laterally, because any deepening of them is at the expense of the tread portion of the tire, and for buggies, carriages, and the like, in city driving, especially, the treads of solid-rubber tires will not bear more reduction relatively than here shown. In all such tires also the strain comes chiefly sidewise, as when a loaded carriage makes a short quick turn. Then, again, there is constantly more or less side strain by reason of our laterally sloping or rounding streets. Hence the difficulty in getting tires so constructed and secured as to withstand the weight and the side strain under which they are in danger of being rolled out of their containing-channels. Now I have provided against this chief danger with such tires by a novel construction of the transverse wires or irons G, which traverse the base of the tire at regular and frequent intervals and have their ends just under cover from above at the tops of ledges 2, while their extremities project through the rubber into contact with the flanges 4. When the tire is in working position, the tie or binding wires E are tightened upon ledges 2 and contracted so as to come down, say, flush with the tops of said flanges, substantially as shown, so that it would seem as if this were sufficient to confine the tire under any and all circumstances, and so it is generally; but in extreme cases and under unusual and sudden whirl of the vehicle it has been found that the short cross-wires are liable to pull out on the strained side from beneath the tie-wires, and thus allow the tire to roll out of its seat and off the wheel. My invention is directed to the overcoming of this danger, and I do successfully overcome and avert it by forming said wires or irons G with a decided upward bow or bend 5 at their center. This brings the pressure or weight on the wheel always into direct bearing upon said portion with the certain effect of spreading the points or ends of the iron or wire laterally against flanges 3. This pressure occurs even though the strain be more or less lateral or even somewhat horizontal instead of wholly downward, for the bend of the iron is expressly made to anticipate these extreme conditions. Of course there will always be some downward pressure on the tread at the time of danger, and this coming upon the bowed cross irons or wires like mine is sufficient to counterbalance the other tendency to pull out, as before, and thus the pulling out of the wires is defeated and the invention has done its work.

Another feature of the bowed cross irons or wires is that the wires are more deeply and centrally embedded in the tire itself, thus giving more stock between it and the bottom edge, which is of especial advantage in preventing the wires from tearing through the rubber when a hard blow or side strain tends to force the tire from its channel-rim.

What I claim is—

1. As a new article of manufacture, a solid-rubber tire having a base terminating in ledges along the sides of the tire and a series of separate spring-metal strips embedded transversely therein and having their ends in said ledges and their body portions bowed outward, substantially as described.

2. In vehicle-tires, a rim with side flanges, in combination with a solid-rubber tire within the flanges of the rim and having ledges along its base and a series of irons embedded transversely in said base with ends in said ledges and having their middle portion bowed outward, and tie-wires bearing upon said ledges over the ends of the said irons, substantially as described.

Witness my hand to the foregoing specification this 6th day of September, 1900.

JACOB PFEIFFER.

Witnesses:
M. A. SHEEHAN,
R. B. MOSER.